United States Patent
Ohtake et al.

[11] 3,886,517
[45] May 27, 1975

[54] VEHICLE FAULT DETECTING AND INDICATING SYSTEM

[75] Inventors: Toshikazu Ohtake, Okazaki; Koichi Taniguchi; Yasuhiko Sakurai, both of Kariya; Nobumasa Higo; Jun Ohta, both of Toyota, all of Japan

[73] Assignees: Nippondenso Co., Ltd.; Toyota Jidosha Kogyo Kabushiki Kaisha, both of Kariya-shi, Japan

[22] Filed: May 30, 1974

[21] Appl. No.: 474,859

[30] Foreign Application Priority Data
June 2, 1973 Japan.................. 48-62111

[52] U.S. Cl................... 340/52 F; 340/244 R
[51] Int. Cl................... G08b 19/00
[58] Field of Search .... 340/52 A, 52 C, 52 F, 52 R, 340/57, 59, 60, 244 R; 317/13 R, 154; 335/21, 38, 41

[56] References Cited
UNITED STATES PATENTS
3,250,950  5/1966  Reiche.................. 340/52 F
3,560,918  2/1971  Lewis et al.................. 340/59 X
3,828,308  8/1974  Kobayashi.................. 340/52 C

*Primary Examiner*—Alvin H. Waring
*Attorney, Agent, or Firm*—Cushman, Darby & Cushman

[57] ABSTRACT

There is provided a fault detecting and indicating system for a vehicle whereby when the level of engine oil or the thickness of brake lining becomes smaller than a predetermined value, such an abnormal condition is detected by a fault detector and an indicator lamp is lighted by a detection holding circuit. The indicator lamp is designed so that it is not allowed to go on in response to any transient fluctuations in the level of the engine oil, whereas once the indicator lamp has been lighted it is held on until a power switch is opened and it is thus independently of the fault detector. The fault detecting and indicating system is further provided with a check circuit which is capable of separately checking the indicator lamp for burnout.

8 Claims, 5 Drawing Figures

3,886,517

VEHICLE FAULT DETECTING AND INDICATING SYSTEM

The present invention relates to a fault detecting and indicating system which accurately detects and indicates abnormal conditions of components monitored for fault detection.

Detecting and indicating systems of the above type have been proposed in which the level of vehicle engine oil, for example, is detected and indicated by means of a thermally sensitive variable resistance element, e.g., a thermistor. A disadvantage of the conventional system of this type is that when a vehicle inclines or vibrates due to the surface conditions of a road on which it is running, the system is frequently caused to given an erroneous indication in response to such inclination or vibration of the vehicle.

With a view to overcoming the foregoing difficulty, it is an object of the present invention to provide a fault detecting and indicating system wherein when any fault occurs in a component monitored for fault detection, it is detected by a fault detector so that one of differential relay coils is deenergized and, a magnetic switching element adapted to be closed in response to a change in the electromagnetic attraction caused by the deenergization of the relay coil establishes and maintains a short-circuit across the relay coil, whereby any fault in a component monitored for fault detection can be accurately detected and indicated continuously without being influenced by various ambient conditions and moreover the indication holding function can be performed by a simple arrangement comprised of the differential relay coils and the magnetic switching element which are not easily caused to operate erroneously by noise.

Above and other objects, features and advantages of the present invention will become readily apparent by considering the following detailed description in conjunction with the accompanying drawings, in which.

The present invention will now be described in greater detail with reference to the illustrated embodiments.

Figure 1:
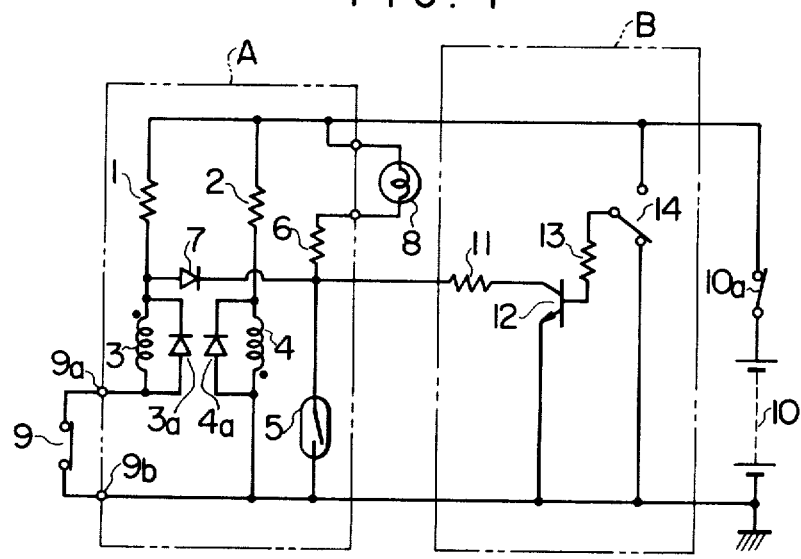
FIG. 1 is a wiring diagram showing a first embodiment of a fault detecting and indicating system according to the invention.

Referring first to FIG. 1 showing a first embodiment, designated as A is a detection holding circuit, B a check circuit, 1 and 2 current limiting resistors, 3 and 4 first and second coils constituting differential relay coils which are wound in opposite directions to each other, 3a and 4a flywheel diodes for respectively absorbing the counter electromotive force of the coils 3 and 4, 5 a normally open reed switch as a magnetic switching element, 6 a protective resistor, 7 a diode, 8 a lamp consituting an indicator, 9 a fault detector whereby when any abnormal condition of an object of fault detection is detected, the circuit between its terminals 9a and 9b is opened and this opening action deenergizes the first coil 3 which is connected in series with the detector 9 through the terminals 9a and 9b. Numeral 10 designates a power source comprised of a battery installed in a vehicle, 10a a power switch, 11 a resistor, 12 a checking transistor, 13 a base resistor, 14 a check switch.

With the construction described above, the operation of the first embodiment is as follows. When a component monitored for fault detection is in the normal condition, the fault detector 9 is in the closed position so that the first and second coils or differential relay coils 3 and 4 are energized and the resultant fields of the differential relay coils 3 and 4 cancel each other. Consequently, the reed switch 5 is not closed and the current flow through the lamp 8, the protective resistor 6, the first coil 3 and the fault detector 9 to the ground is blocked by the diode 7. Thus, the lamp 8 is not lighted indicating that the component monitored for fault detection is in the normal condition.

On the other hand, once a fault has occurred in the component monitored for fault detection, this abnormal condition is detected by the fault detector 9 and the circuit between the terminals 9a and 9b is opened. Consequently, when the first coil 3 of the differential relay coils is deenergized so that its electromagnetic attraction disappears, the reed switch 5 is closed by the electromagnetic attraction of the second coil 4. The closing of the reed switch 5 causes the lamp 8 to turn on and give an indication of the fault in the component monitored. At the same time, a short-circuit is established across the first coil 3 by the closed reed switch 5 and the diode 7, whereby if the fault detector 9 is returned to the original closed position by any erroneous operation caused, for example, by the inclination or vibration of the component monitored, the first coil 3 does not generate any electromagnetic attraction that will cancel the electromagnetic attraction of the second coil 4 and the lamp 8 is held on. In this way, any fault condition in the component part monitored can be accurately indicated without any possivility of erroneous indication. The indication holding operation may be released by opening the power switch 10a.

On the other hand, whether the lamp 8 is functioning normally or it has burned out may be checked by means of the check circuit B. In other words, by throwing the check switch 14 to the power source 10 side, the checking transistor 12 is turned on so that a current is forcibly supplied to the lamp 8 by virtue of the condition of the transistor 12, whereby when the lamp 8 is lighted it indicates that the lamp 8 is functioning normally, whereas when the lamp 8 fails to go on it indicates that the lamp 8 has burnt out and thus the burnout of the lamp 8 can be checked.

Figure 2:
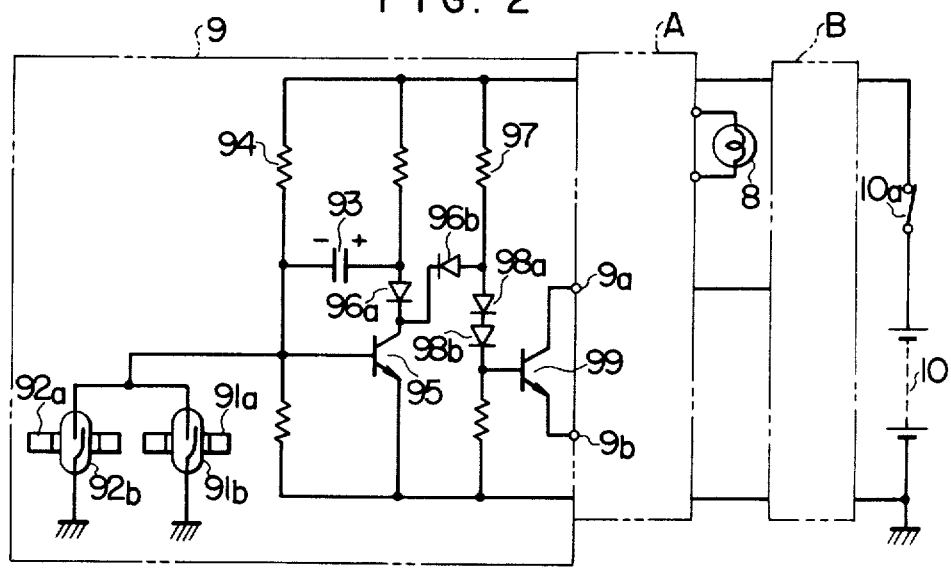
FIG. 2 is a wiring diagram showing a second embodiment of the system according to the invention.

In the second embodiment illustrated in FIG. 2, the fault detecting system according to the invention is used to detect a fault in an object of detection, i.e., the low level of an oil an oil pan or a liquid container installed in a vehicle, whereby when the oil level decreases abnormally it is detected and indicated positively. Thus, the fault detector 9 of the second embodiment differs from that of the first embodiment and it may be constructed as shown in FIG. 2. In other words, the fault detector 9 is comprised of reed switches 91b and 92b which are respectively actuated by magnet floates 91a and 92a, and the reed switch 91b is mounted in the left front part of the oil pan and the reed switch 92b is mounted in the right rear part of the oil pan so that the reed switches 91b and 92b are arranged opposite to each other along a diagonal line on the surface of the oil to prevent the occurrence of mis-operation and ensure a higher degree of reliability. Under normal conditions where the oil level is higher than a detection level, both of the reed switches 91b and 92b are closed by the magnetic forces of the magnet floates 91a and 92a. In other words, the uppermost positions of the magnet floates 91a and 92a are controlled by stoppers which are not shown, and in this way the magnet floates 91a and 92a are positioned to normally close the reed switches 91b and 92b.

When the reed switches 91b and 92b are in the closed position as mentioned above, a transistor 95 is turned off and its collector potential becomes substantially equal to the power supply potential. Consequently, no current flows to both reverse current blocking diodes 96a and 96b. In this case, a capacitor 93 is charged in the polarity shown. On the other hand, the current flow through a resistor 97 supplies through level shifting diodes 98a and 98b a base current to a transistor 99 to turn it on. Consequently, a circuit is normally established between the terminals 9a and 9b and the lamp 8 connected to the detection holding circuit A is not lighted.

When the oil level becomes abnormally low so that the oil level falls below the detection level to open both of the reed switches 91b and 92b, the transistor 95 is turned on. However, the transistor 99 is not turned off immediately. Namely, the collector potential of the transistor 95 does not drop to a level which turns the transistor 99 off until the expiration of, for example, 3 seconds during which the charge on the capacitor 93 is discharged through a resistor 94. The purpose of the delay time provided by the capacitor 93 and the resistor 94 is to prevent any erroneous operation of the system due to transient changes in the oil level caused by vibration or the like. After the expiration of this dalay time, the transistor 99 is turned off so that the detection holding circuit A comes into operation and the lamp 8 is lighted. Further, the collector and emitter of the transistor 99 may be connected between the junction point of the resistor 1 and the diode 7 and the first coil 3 in the detection holding circuit A to accomplish the same function as above described.

Figure 3:
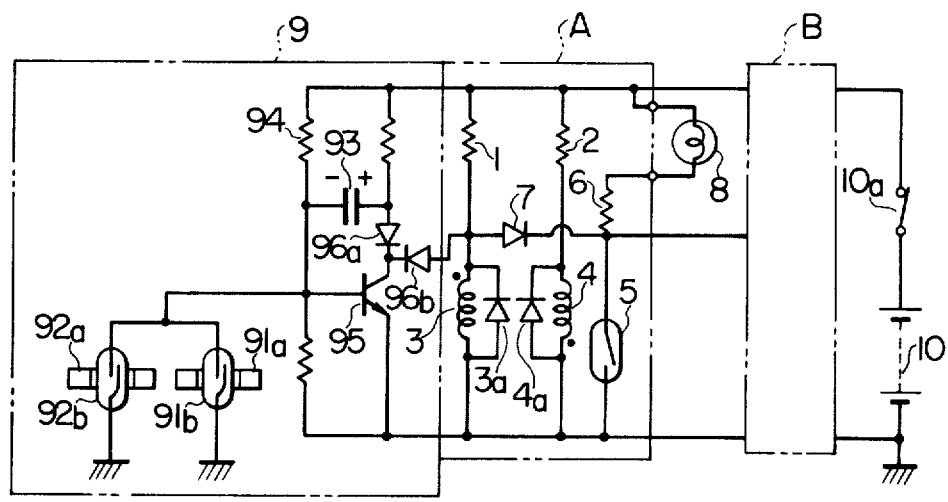
FIG. 3 is a wiring diagram showing a third embodiment of the system according to the invention.

FIG. 3 illustrates a third embodiment of the invention which comprises a modification of the circuit construction of the second embodiment shown in FIG. 2 and in which the fault detector 9 is of the normally open type. In FIG. 3, the component parts identical or equivalent to those shown in FIG. 2 are designated by the like reference numerals. In FIG. 3, different from the embodiment of FIG. 2, the collector of the transistor 95 is connected through the reverse current blocking diode 96 to the junction point of the first coil 3 and the diode 7 in the detection holding circuit A. In this way, the reed switches 91b and 92b are normally closed so that the transistor 95 is turned off and the detection holding circuit A is not actuated. Consequently, the lamp 8 is not lighted.

On the other hand, once the oil level becomes abnormally low so that the positions of the magnet floates 91a and 92a come down and both of the reed switches 91b and 92b are opened, the transistor 95 is turned on. However, the collector potential of the transistor 95 decreases gradually while the charge on the capacitor 93 which has been charged in the polarity shown under the normal conditions is being discharged through the resistor 94. When the collector potential of the transistor 95 eventually decreases below a predetermined value, the electromagnetic attraction of the first coil 3 becomes so small that it no longer cancels the electromagnetic attraction of the second coil 4 and thus the reed switch 5 is closed to light the lamp 8. In this manner, the delay time during which the collector potential of the transistor 95 decreases below the predetermined value is utilized to prevent the system from operating erroneously due to any transient changes in the oil level by vibration or the like.

Figure 4:
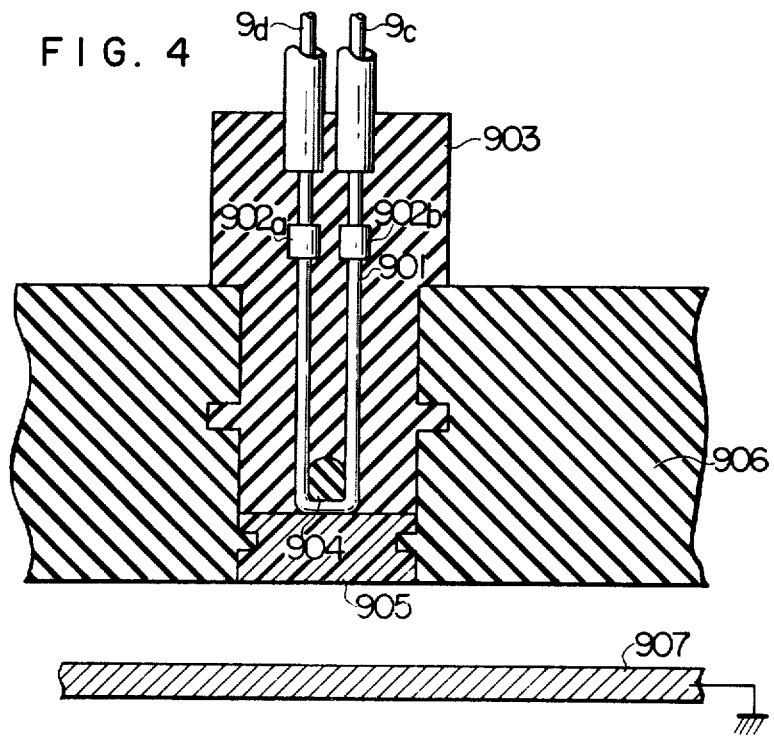
FIGS. 4 and 5 show respectively a sectional view of a fault detector and a wiring diagram of a fourth embodiment of the system according to the invention.
Figure 5:
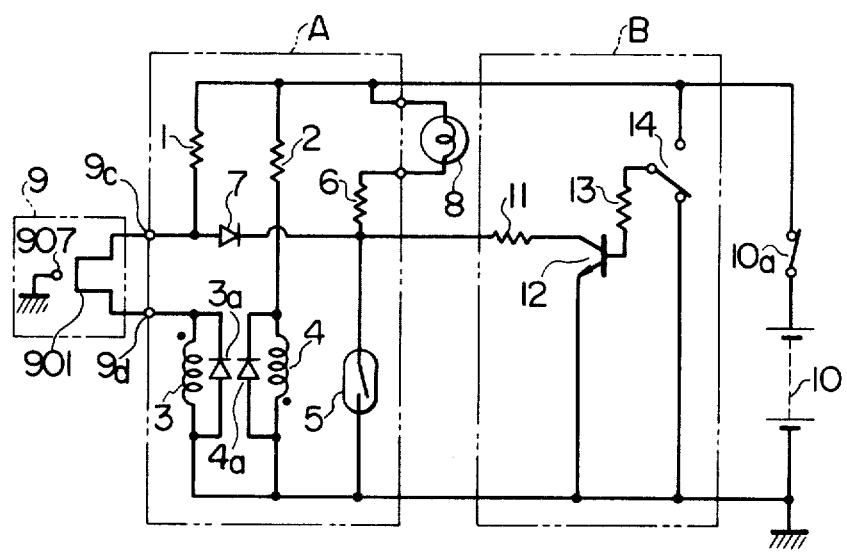

FIGS. 4 and 5 illustrate a fourth embodiment of the invention which is used to detect and indicate that an object of detection, i.e., the brake lining attached to the wheel of a vehicle for braking purposes has worn out and become abnormally thin. Referring first to FIG. 4 showing a sectional view of the fault detector 9, the ends of a U-shaped bare conductor 901 are electrically connected to terminals 9c and 9d through connectors 902a and 902b, and a hard insulator 904 is provided on the upper inner side of the U-shape to prevent any short-circuit at the intermediary portion of the bare conductor 901. The bare conductor 901 is also covered and molded with a rubber 903 so that the upper portion of the U-shape is exposed. The molded rubber 903 is fitted, along with an electrically insulating dust proof resin 905, in a brake lining 906. The brake lining 906 is electrically insulating and it is constructed so that it is forced in contact with an oppositely arranged and grounded conductive brake drum 907 to brake the vehicle.

Accordingly, when the brake lining 906 wears down and hence the dust proof resin 905 wears away completely due to the repeated braking operations, the upper portion of the bare conductor 901 is exposed. When, in this condition, the brakes are applied so that the brake lining 906 is forced into contact with the brake drum 907, the bare conductor 901 is grounded through the brake drum 907.

The circuit construction of the fourth embodiment for indicating the detection of the fault detector 9 will now be described with reference to FIG. 5. This circuit construction is identical with that of the first embodiment of FIG. 1 excepting the manner in which the fault detector 9 is connected to the detection holding circuit A. In other words, the terminals 9c and 9d of the fault detector 9 are connected between the junction point of the resistor 1 and the diode 7 and the first coil 3.

With the construction described above, since the bare conductor 901 is exposed when the brake lining 906 wears down to an abnormal degree, a further application of the brakes forces the brake lining 906 against the brake drum 907 and the bare conductor 901 is also forced into contact with the brake drum 907 to be grounded therethrough. When this occurs, no current flows through the first coil 3 and the reed switch 5 is closed by the electromagnetic attraction of the second coil 4 causing the lamp 8 to turn on. Simultaneously, a circuit is established which extends to the ground through the resistor 1, the diode 7 and the closed reed switch 5. Consequently, if the bare conductor 901 is disconnected from the ground by the releasing of the braking operation, the first coil 3 is short-circuited thereacross and the electromagnetic attraction of the second coil 4 is not cancelled. Consequently, the lamp 8 is not lighted in response to the releasing of the braking operation and it continues to turn on to accurately indicate that the brake lining 906 has worn and become abnormally thin. Further, the lamp 8 turns on when there is a break in the bare conductor 901 and therefore the conductor fault detecting and indicating function can also be performed. The other functions of the fourth embodiment of FIGS. 4 and 5 are identical with those of the first embodiment shown in FIG. 1.

What we claim is:

1. A fault detecting and indicating system comprising:
   a fault detector for detecting a fault in an object of fault detection;
   differential relay coil means having a first coil adapted to be deenergized when said fault detector detects a fault, and a second coil wound in a direction opposite to said first coil and normally energized;
   means including a magnetic switching element whereby in response to a change of electromagnetic attraction caused by the deenergization of said first coil of said differential relay coil means, said magnetic switching element is turned on to short-circuit said first coil and provide a second energizing circuit; and
   an indicator adapted to be actuated by said second energizing circuit to give an indication of fault.

2. A system according to claim 1, wherein said second energizing circuit establishing means includes a magnetic switching element for short-circuiting said first coil, and a diode for establishing said second energizing circuit through said magnetic switching element.

3. A system according to claim 1, wherein said fault detector is comprised of a normally closed switch adapted to be opened upon detection of a fault, and said normally closed switch is connected in series with said first coil of said differential relay coil means.

4. A system according to claim 2, wherein said fault detector is comprised of a normally closed switch adapted to be opened upon detection of a fault, and said normally closed switch is connected in series with said first coil of said differential relay coil means.

5. A system according to claim 1, wherein said fault detector is comprised of a normally open switch adapted to be closed upon detection of a fault, and said first coil of said differential relay coil means is short-circuited upon the closing of said normally open switch.

6. A system according to claim 2, wherein said fault detector is comprised of a normally open switch adapted to be closed upon detection of a fault, and said first coil of said differential relay coil means is short-circuited upon the closing of said normally open switch.

7. A system according to claim 1, wherein said fault detector detects an abnormal drop in the level of an oil.

8. A system according to claim 1, wherein said fault detector detects an abnormal wear of a brake lining.

* * * * *